(12) United States Patent
Roy et al.

(10) Patent No.: US 9,703,963 B2
(45) Date of Patent: Jul. 11, 2017

(54) TRUSTED AND PRIVACY-PRESERVING MECHANISM FOR ELECTRICITY USAGE DATA DISCLOSURE USING VERIFIABLE NOISE

(71) Applicant: FUJITSU LIMITED, Kawasaki-shi, Kanagawa (JP)

(72) Inventors: Arnab Roy, Santa Clara, CA (US); Daisuke Mashima, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/274,526

(22) Filed: May 9, 2014

(65) Prior Publication Data
US 2015/0324604 A1    Nov. 12, 2015

(51) Int. Cl.
| | |
|---|---|
| H04L 29/06 | (2006.01) |
| G06F 21/60 | (2013.01) |
| G06F 21/62 | (2013.01) |
| H04L 9/32 | (2006.01) |
| H04L 9/00 | (2006.01) |

(52) U.S. Cl.
CPC .......... *G06F 21/60* (2013.01); *G06F 21/602* (2013.01); *G06F 21/62* (2013.01); *G06F 21/6245* (2013.01); *H04L 9/003* (2013.01); *H04L 9/321* (2013.01); *H04L 9/3247* (2013.01)

(58) Field of Classification Search
CPC .... G06F 21/6245; G06F 21/602; G06F 21/64; H04L 9/321; H04L 9/3247; H04L 9/3281; H04L 9/3294; H04L 9/32; H04L 63/0428; H04L 63/123; H04L 9/3286; H04N 21/8358; H04N 1/32144;
(Continued)

(56) References Cited

U.S. PATENT DOCUMENTS

| | | | | |
|---|---|---|---|---|
| 5,617,084 A | * | 4/1997 | Sears | ..................... G08C 15/00 331/176 |
| 6,041,316 A | * | 3/2000 | Allen | ................... G06Q 20/085 705/52 |

(Continued)

OTHER PUBLICATIONS

G., Danezis et al., "Privacy-preserving Smart Metering" Privacy Enhancing Technologies, PETS, vol. 6794, 2011.
(Continued)

*Primary Examiner* — Mohammed Waliullah
(74) *Attorney, Agent, or Firm* — Maschoff Brennan

(57) ABSTRACT

A method of energy usage data privacy preservation is described. The method includes downloading energy usage data and a signature from a repository. The method includes determining whether the signature is that of a utility. When the signature is not that of the utility, the method includes rejecting the energy usage data. When the signature is that of the utility, the method includes generating noisy data, encrypting a message-signature pair, constructing a proof, and communicating the noisy data, the encrypted message-signature pair, and the proof to a third party. The noisy data is generated by adding random noise to the energy usage data. The message-signature pair includes the energy usage data and a verified signature. The proof is configured to establish that the encrypted message-signature pair and the noisy data are members of a corresponding proof language.

14 Claims, 5 Drawing Sheets

(58) Field of Classification Search
CPC ..... H04N 2201/3233; G11B 20/00086; G06Q 20/341; G07F 7/1008
USPC .................. 713/176, 179, 180, 181
See application file for complete search history.

(56) References Cited

U.S. PATENT DOCUMENTS

| | | | | |
|---|---|---|---|---|
| 6,618,709 | B1* | 9/2003 | Sneeringer | G06Q 30/0283 705/400 |
| 8,015,405 | B2* | 9/2011 | Furukawa | H04L 9/3221 713/168 |
| 8,214,654 | B1* | 7/2012 | Wyatt | G06F 21/572 713/191 |
| 8,762,736 | B1* | 6/2014 | Goldwasser | G06F 21/00 235/375 |
| 2008/0000969 | A1* | 1/2008 | Salomonsen | G07C 13/00 235/386 |
| 2011/0202764 | A1* | 8/2011 | Furukawa | G06F 21/6254 713/167 |
| 2012/0137126 | A1* | 5/2012 | Matsuoka | H04L 9/0838 713/156 |
| 2013/0096954 | A1* | 4/2013 | Bodas | G06Q 10/10 705/4 |
| 2013/0305178 | A1 | 11/2013 | Matsuzawa et al. | |
| 2014/0223526 | A1* | 8/2014 | Lu | H04L 63/0407 726/6 |
| 2014/0237284 | A1* | 8/2014 | Fine | G06F 21/00 713/340 |
| 2014/0310524 | A1* | 10/2014 | Yamanaka | H04L 9/3242 713/170 |
| 2015/0128283 | A1* | 5/2015 | Mashima | G06Q 50/06 726/26 |
| 2015/0293923 | A1* | 10/2015 | Eide | G06F 17/30321 707/749 |

OTHER PUBLICATIONS

Shi, Elaine, T-H. Hubert Chan, Eleanor G. Rieffel, Richard Chow, and Dawn Song. "Privacy-Preserving Aggregation of Time-Series Data." In NDSS, vol. 2, p. 4. Feb. 2011.

L. Fan and L. Xiong. Adaptively sharing time-series with differential privacy. CoRR, abs/1202.3461, 2012.

G., Lahoti et al., SEGS '13 Proceedings of the first ACM workshop on "Smart energy grid security" Nov. 2013, pp. 53-64.

* cited by examiner

TRUSTED AND PRIVACY-PRESERVING MECHANISM FOR ELECTRICITY USAGE DATA DISCLOSURE USING VERIFIABLE NOISE

FIELD

The embodiments discussed herein are related to privacy-preserving communication of energy usage data.

BACKGROUND

Utility companies often incentivize reduction in energy usage during certain high-load periods to ensure the utility is able to meet demand. For example, in summer months peak energy usage may occur on hot days in the late afternoon. The utility may offer an incentive to a factory to reduce energy usage during the late afternoon to ensure the utility is able to meet the demand during the peak energy usage. In response, the factory may delay a high-load production run until later in the evening. The changes in energy usage during peak or high-load periods may be referred to as a demand response (DR) event. DR events may include a time period during which the utility expects a high demand and asks customers to reduce or curtail energy usage. When a customer reduces its energy usage by an agreed-upon amount, the utility may provide the incentive to the customer.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, method of energy usage data privacy preservation is described. The method may include downloading energy usage data and a signature from a repository. The method may include determining whether the signature is that of a utility. When the signature is not that of the utility, the method may include rejecting the energy usage data. When the signature is that of the utility, the method may include generating noisy data, encrypting a message-signature pair, constructing a proof, and communicating the noisy data, the encrypted message-signature pair, and the proof to a third party. The noisy data may be generated by adding random noise to the energy usage data. The message-signature pair may include the energy usage data and a verified signature. The proof may be configured to establish that the encrypted message-signature pair and the noisy data are members of a corresponding proof language.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Figure 1:
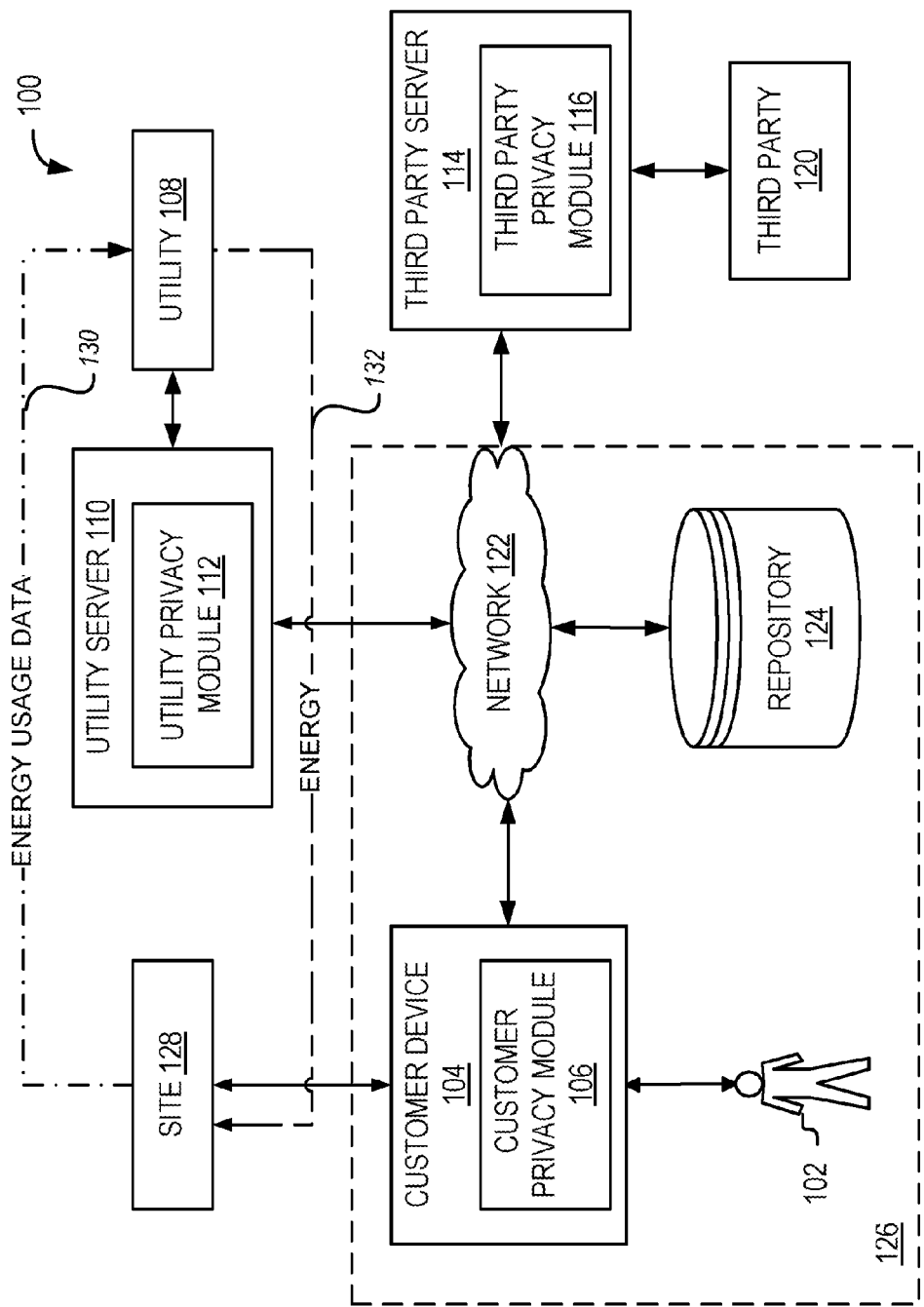
FIG. 1 illustrates a block diagram of an example demand response (DR) aggregation system (DR system)

Broad penetration of smart meters and advanced metering infrastructure (AMI) has enabled bidirectional communication between utilities and customers and collection of fine-grained energy usage data. Additionally, data management and sharing in electrical systems has become more complicated. For example, some data analytics of energy usage data may be outsourced by utilities to a third party. Moreover, to facilitate large-scale demand response (DR) services, a type of third-party service providers called DR aggregators have emerged.

The DR aggregators collect and/or evaluate energy usage data under DR aggregation models. Generally, privacy of the customers may not be a priority under the DR aggregation models. For example, the DR aggregators or another service provider may install a metering device at each site and may collect any desired energy usage data. Such data collection may be justified because the DR aggregator has an interest in trustworthy data for accounting purposes. However, collected energy usage data may be potentially compromised or leaked as a result of hacking or malware attacks. Moreover, once the energy usage data is disclosed to third parties (e.g., the DR aggregators), the energy usage data may be difficult for customers to retain control and/or awareness over second-hand usage or sharing of the energy usage data. Additionally, there is a possibility of unauthorized usage, authorized or unauthorized sharing of data by service providers, and unintentional information breaches that may increase privacy risks.

Accordingly, some embodiments described herein relate to privacy-preserving communication of energy usage data. In an example embodiment, energy usage data may be communicated to a repository by a utility. The utility may sign the energy usage data, which may indicate that the source of the energy usage data is the utility and enable data integrity verification by third parties. A customer may then download the energy usage data and signature. After the energy usage data is downloaded, the customer may verify the signature is that of the utility. The customer may then generate noisy data based on adding random noise to the energy usage data. The customer may also encrypt a message-signature pair that includes the energy usage data and the verified signature. The customer may then construct a non-interactive zero knowledge (NIZK) proof configured to establish that the encrypted message-signature pair and the noisy data are members of a specifically-configured language, which is herein referred to as "designed NP language." The designed NP language may belong to a class of Non-deterministic Polynomial time (NP) languages. The designed NP language may be configured to claim that the added noise is bounded within a certain range without revealing any further information about the original energy usage data and that the original data was issued by the utility. The customer may then communicate the noisy data, the encrypted message-signature pair, and the NIZK proof to a third party such as a DR aggregator. The third party may receive the noisy data, the encrypted message-signature pair, and the NIZK proof and may verify that the NIZK proof is a valid proof of a particular expression. The expression may state that the added noise is bounded within a certain range without revealing any further information about the original energy usage data and that the original data was issued by the utility. Accordingly, the third party may verify that the source of the energy usage data is the utility and that the noisy data is within some noise bound of the energy usage data. After making such verification, the third party may use the noisy data rather than the original energy usage data. The customer's privacy may be preserved insofar as portions of the energy usage data may be obfuscated by the random noise while still providing the third party with trustworthy data. This and other embodiments are described with reference to the accompanying figures.

FIG. 1 illustrates a block diagram of an example DR system 100. The DR system 100 may be configured as a customer-centric DR system in which a customer 102 has control over energy usage data generated at a site 128 associated with the customer 102. For example, the DR system 100 may include a customer domain 126. The customer domain 126 may include a customer device 104 and a repository 124. While the energy usage data is in the customer domain 126, the customer 102 may control the energy usage data and may control access to the energy usage data.

Generally, the DR system 100 is configured such that energy usage data may be communicated from the customer domain 126 to a third party 120 while preserving privacy of the customer 102. Specifically, the energy usage data in the DR system 100 may present privacy concerns to the customer 102 because behaviors of the customer 102 may be derived from the energy usage data. For example, a particular appliance the customer 102 uses at a particular time may be derived from the energy usage data. Nevertheless, the customer 102 may have an incentive to communicate the energy usage data to the third party 120. Accordingly, in the DR system 100, the customer 102 may modify the energy usage data to reduce privacy concerns presented by the energy usage data.

There may be a limit to an amount the customer 102 may modify the energy usage data. Specifically, the permitted modification of the energy usage data may not be so extensive that the third party 120 is unable to evaluate the modified data. For example, having received the energy usage data, the third party 120 may only accept the modified energy usage data if the third party is able to evaluate particular characteristics of the energy usage data. Moreover, the third party 120 may want assurances as to the validity and/or source of the modified data. Thus, some embodiments discussed herein may provide a customer-centric DR system in which energy usage data may be modified to reduce privacy concerns of the customer 102 while providing the third party 120 with modified data that is usable and verifiable.

In the DR system 100 of FIG. 1, a utility 108 may distribute electricity to the site 128. Accordingly, data modified and communicated in the DR system 100 may include energy usage data. In some embodiments, the utility 108 may provide another resource such as natural gas or water to the site 128. Thus, in these embodiments, the data modified and communicated may include other types of data related to the resource, such as resource consumption. Moreover, some embodiments may be applicable in other systems or environments. For example, similar processes may be used for privacy preservation in environments in which there is sensitive time-series data such as personal wearable devices, medical diagnostics, automotive or vehicle data, insurance company communications, and the like.

The DR system 100 depicted in FIG. 1 may include the utility 108, the third party 120, the site 128, the repository 124, and the customer 102. The utility 108 may be associated with a utility server 110, the customer 102 may be associated with the site 128 and the customer device 104, and the third party 120 may be associated with a third party server 114. The term "associated with" when used herein to refer to a relationship between an entity (e.g., the third party 120 and the utility 108) and a server (e.g., the third party server 114 or the utility server 110) or between the customer 102 and the site 128 and the customer device 104, may indicate that the entity and/or the customer 102 owns or otherwise controls, directly or indirectly, the server (110 or 114) or the site 128 and the customer device 104. For example, the third party server 114 may be controlled by the third party 120 and the site 128 and the customer device 104 may be controlled by the customer 102.

In the DR system 100 data including energy usage data, modified energy usage data, encrypted information, public keys for signature verification, and proofs (e.g., cryptographic proofs) may be communicated between the utility server 110, the third party server 114, the repository 124, and the customer device 104 via a network 122.

The network 122 may be wired or wireless, and may have numerous configurations including a star configuration, token ring configuration, or other configurations. Furthermore, the network 122 may include a local area network (LAN), a wide area network (WAN) (e.g., the Internet), and/or other interconnected data paths across which multiple devices may communicate. In some embodiments, the network 122 may be a peer-to-peer network. The network 122 may also be coupled to or include portions of a telecommunications network that may enable communication of data in a variety of different communication protocols.

In some embodiments, the network 122 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc.

In the DR system 100, the utility 108 may distribute electricity, which may also be referred to herein as energy, to the site 128. The distribution of the energy by the utility 108 to the site 128 is denoted in FIG. 1 at 132. Additionally, the utility 108 may collect energy usage data from the site 128. The collection of energy usage data is denoted in FIG. 1 at 130. The utility 108 may include any entity involved in production, transmission, and/or distribution of electricity. The utility 108 may be publicly owned or may be privately owned. Some examples of the utility 108 may include a power plant, an energy cooperative, and an independent system operator (ISO). The utility 108 may set terms for DR events. For example, the utility 108 may set an incentive exchanged for participation in the DR event, a time period of the DR event, a duration of the DR event, and an energy usage curtailment for the DR event.

The site 128 may include buildings, structures, equipment, or other objects that use electricity distributed by the utility 108. The site 128 may have adapted thereto a meter such as a smart meter that measures the energy distributed to the site 128. The meter may communicate the energy usage data to the utility 108. In some embodiments, energy usage data may be communicated to the utility 108 via the network 122. Based on the energy usage data, the utility 108 may ascertain the energy usage of the site 128, which may be used to bill the customer 102, for example.

The repository 124 may include any storage device or storage server that may be capable of communication via the network 122. The repository 124 may include memory and a processor. The repository 124 may allow the energy usage data to be stored at least temporarily therein. The energy usage data may then be accessed. For example, the utility 108 may communicate energy usage data collected from the site 128 to the repository 124. The customer device 104 may then download the energy usage data or a portion thereof from the repository 124. The customer 102 may browse/operate on the downloaded energy usage data on the repository 124.

In FIG. 1, the repository 124 is depicted as being separate from the customer device 104, the utility server 110, and the third party server 114. In some embodiments, the repository 124 may be included in the customer device 104. Additionally or alternatively, the repository 124 may be included in or hosted by a trusted entity. In some embodiments, access to the energy usage data may be via a website, a computer application (e.g., a mobile application), or via a browser-based interface.

The utility server 110 associated with the utility 108 may include a hardware server that includes a processor, a memory, and network communication capabilities. In the illustrated embodiment, the utility server 110 may be coupled to the network 122 to send and receive data to and from the customer device 104, the repository 124, and the third party server 114 via the network 122.

The utility server 110 may include a utility privacy module 112. The utility privacy module 112 may be configured to receive energy usage data and to sign the energy usage data. The utility privacy module 112 may sign the energy usage data using a sign algorithm. In some embodiments, the signature may be generated using an existentially unforgeable signature scheme. By signing the energy usage data, the utility privacy module 112 may authenticate a source of the energy usage data as the utility 108 and may ensure integrity of the energy usage data. The utility privacy module 112 may then communicate the energy usage data and a signature to the repository 124.

The customer 102 may include individuals, groups of individuals, or other entities, for example. The site 128 and the customer device 104 may be associated with the customer 102. In some embodiments, the customer 102 may determine whether to participate in the DR events issued by the utility 108 or by the third party 120. The customer 102 may accordingly curtail energy usage of the site 128 in accordance with the DR event. In addition, the customer 102 may be responsible for communication of energy usage data of the site 128 to substantiate the energy curtailment of the site 128 is in accordance with the DR event.

The customer device 104 may include a computing device that includes a processor, memory, and network communication capabilities. For example, the customer device 104 may include a laptop computer, a desktop computer, a tablet computer, a mobile telephone, a personal digital assistant ("PDA"), a smartphone, a mobile e-mail device, a portable game player, a portable music player, a television with one or more processors embedded therein or coupled thereto, or other electronic device capable of accessing the network 122.

The customer device 104 may include a customer privacy module 106. The customer privacy module 106 may be configured to download energy usage data and the signature. In embodiments in which the repository 124 is separate from the customer device 104, the customer privacy module 106 may download the energy usage data and the signature from the repository 124. Additionally or alternatively, in embodiments in which the repository 124 is included in the customer device 104, the customer privacy module 106 may access the energy usage data and the signature from the repository 124 included in the customer device 104.

The customer privacy module 106 may additionally or alternatively be included in or hosted by the repository 124. In these and other embodiment, the customer device 104 may act as front end device, which may be used to access the customer privacy module 106 and/or information communicated to the customer privacy module 106. For example, the customer privacy module 106 may be run in a browser, which may provide an interface through which the customer 102 may interface with the customer privacy module 106.

The customer privacy module 106 may be configured to determine whether the signature is that of the utility 108. For example, the signature may be verified using a verification key. The verification key may include a public key of the utility 108. The verification key may be generated using a signature key generation algorithm. The verification key may be input to a verify algorithm by the customer privacy module 106 along with energy usage data signed with a signing key of the utility 108.

The verify algorithm may enable the customer privacy module 106 to determine whether the signature is that of the utility 108. For example, when the signature is that of the utility 108, the verify algorithm may output a success signal and the customer privacy module 106 may be configured to accept the energy usage data. When the signature is not that of the utility 108, the verify algorithm may output a failure signal and the customer privacy module 106 may be configured to reject the energy usage data.

When the signature of the energy usage data is that of the utility 108, the customer privacy module 106 may be configured to add (e.g., point-to-point addition) random noise to the energy usage data. The energy usage data with the random noise may be referred to herein as noisy data. The random noise may obscure portions of the energy usage data that may introduce the privacy concerns to the customer 102. The random noise may generally include a signal having no or an unrelated meaning. The random noise may randomly vary in amplitude and/or in frequency.

The random noise may be limited by a noise bound. The noise bound may include a portion or percentage of the energy usage data. The random noise added to the energy usage data may be configured to vary the energy usage data by an amount up to or less than the selected noise bound. For example, the energy usage data may include a time series of energy usage data between 8:00 AM on January 1 and 8:00 AM on January 2 and a noise bound may be selected as 10%. The customer privacy module 106 may then add some random noise to the energy usage data such that the noisy data is between 0.9 and 1.1 of the energy usage data.

The customer privacy module 106 may be configured to select the noise bound or may receive a selection of the noise bound from one or more of the third party 120, the customer device 104 (e.g., via a user input), and the utility 108. In some embodiments, a privacy setting tool may be provided to the customer device 104. The privacy setting tool may enable selection of a privacy preference. The privacy preference may in turn select a noise bound applied to the energy usage data. For example, the privacy setting tool may include a "low," a "medium," and a "high" setting. The low setting may include a noise bound of 4%, the medium setting may include a noise bound of 8%, and the high setting may include a noise bound of 12%.

Additionally, in some embodiments, the noise bound may be selectable and/or changeable. In some circumstances, the noise bound may be pre-determined between the customer 102 and the third party 120. The noise bound may then be fixed during one or more subsequent transactions between the third party 120 and the customer 102. Additionally or alternatively, a noise bound may be agreed upon before each transaction between the customer 102 and the third party 120. The noise bound may be changed by the customer 102 and/or the third party 120 in a subsequent transaction or upon some further negotiations between the customer 102 and the third party 120 for a current transaction.

For example, in response to a request by the third party 120, the customer 102 may select on the customer device 104 a noise bound of 10% and may communicate the noisy data to the third party server 114 via the network 122. The third party 120 may be unable to evaluate the noisy data or may be interested in more accurate (e.g., less random noise added) data. The third party 120 or the third party server 114 may communicate a message to the customer device 104 that includes a request and/or an incentive for the customer 102 to reduce the noise bound, re-generate, and re-communicate the noisy data.

In some embodiments, the customer privacy module 106 may be configured to encrypt the energy usage data and/or the verified signature as a message-signature pair. The encryption may be implemented according to a random number or a pseudo-random number, for instance. By encrypting the message-signature pair, the third party 120 may not have access to the energy usage data, which may present the privacy concerns discussed herein, but the third party 120 may have access to a representation of the energy usage data and to a representation of the signature (e.g., an encrypted representation of the energy usage data and the signature).

The customer privacy module 106 may then construct a proof such as a cryptographic proof. The proof may prove that that the noisy data generated by the customer privacy module 106 and the encrypted message-signature pair are related. The proof may show that the noisy data is indeed from a range of values bounded by the noise bound and may bind the noisy data to the original energy usage data by the encryption performed by the customer privacy module 106. The customer privacy module 106 may then communicate the proof, the encrypted message-signature pair, the noisy data, or some combination thereof to the third party server 114 via the network 122.

The third party 120 may include a service provider or any other entity that may be involved in the DR system 100 that has an interest in receiving or may be provided the energy usage data. While example embodiments are discussed herein in which the third party 120 includes the DR aggregator, embodiments discussed herein may be implemented in which the third party 120 includes any service provider. For example, in some embodiments of the DR system 100, the third party 120 may be commissioned or otherwise hired to evaluate the energy usage data by the customer 102 and/or the utility 108. For instance, the customer 102 and/or the utility 108 may hire an energy consulting entity, which may evaluate energy usage of the site 128.

Additionally or alternatively, the third party 120 may perform the evaluation according to a contract entered into by the customer 102, the utility 108, the third party 120, or some combination thereof. For example, as discussed elsewhere herein, the third party 120 may include a DR aggregator. The DR aggregator may generally evaluate energy usage data with reference to a DR event and in the context of DR events. Some other examples of entities that may evaluate energy usage data may include governmental regulators, private regulators, and the like. Additionally still, the third party 120 may include another commercial entity, which may have an interest in the energy usage data. For example, the commercial entity may be interested in energy markets, prevalence/usage of energy system equipment, advertising, and the like.

The third party 120 may be associated with the third party server 114. The third party server 114 may include a hardware server that includes a processor, memory, and communication capabilities. In the illustrated embodiment, the third party server 114 may be coupled to the network 122 to send and receive information to and from the customer device 104 and/or the utility server 110 via the network 122.

In the depicted embodiment, the third party server 114 may include a third party privacy module 116. In some embodiments, the third party privacy module 116 may be configured to request certain energy usage data from the customer device 104. In embodiments in which the repository 124 includes the customer privacy module 106, the third party privacy module 116 may be configured to request the certain energy usage data from the repository 124. In these embodiments, the customer 102 may then receive the request by interfacing with the repository 124 via the customer device 104.

The certain energy usage data requested by the third party 120 may include data from a DR event, energy usage data from before and/or after the DR event, energy usage data over a specific time period, energy usage data since an occurrence (e.g., since installation of a heater or air conditioning unit), energy usage data during a specific occurrence (e.g., energy usage data for days during particularly warm period), energy usage data at a specific time during a particular period (e.g., from 1:00 PM to 3:00 PM from June and July of 2013), or any other certain energy usage data.

The certain energy usage data from the DR event may be used as a basis for an evaluation. For example, in embodiments in which the third party 120 includes a DR aggregator, the certain energy usage data may be used to determine whether the customer 102 is in compliance with the DR event. Additionally, the energy usage data from before and/or after the DR event may be used in other ways. For example, the energy usage data from before and/or after the DR event may be used to determine whether the customer 102 and/or the site 128 have energy usage behaviors (e.g., high energy flexibilities) which may make the customer 102 and/or the site 128 good candidates for inclusion in later DR events. The third party 120 may offer separate incentives for the energy usage data from before and/or after the DR event.

In response to the request communicated to the customer device 104, the customer 102 may download or access corresponding energy usage data from the repository 124. Additionally or alternatively, in response to the request, the customer 102 may communicate to the third party server 114 the proof, the encrypted message-signature pair, the noisy data, or some combination thereof derived from the corresponding energy usage data.

The third party privacy module 116 may be configured to receive data such as noisy data, an encrypted message-signature pair, and a proof from the customer device 104. After the data is received, the third party privacy module 116 may determine whether the proof is a valid proof of an expression stating that the noisy data and the encrypted message-signature pair are members of a proof language corresponding to the proof. By making such determination, the third party privacy module 116 may verify that the noisy data is within the noise bound of the energy usage data and that the utility 108 is the source of the energy usage data.

Accordingly, when the proof is a valid proof of the expression, the third party privacy module 116 may accept the noisy data as a basis for DR performance evaluation or another use. When the proof is not a valid proof of the equation, the third party privacy module 116 may reject the noisy data.

Additionally or alternatively, the third party privacy module 116 may evaluate the noise bound. In some embodiments, the third party 120 may determine that the noise bound is too high or the third party 120 may want to reduce the noise bound. In response, the third party privacy module 116 may communicate to the customer 102 and/or the customer device 104 an offer to decrease a selected noise bound in exchange for a particular incentive. In these and other embodiments, the third party 120 may include an advertiser, a DR aggregator (discussed below), a survey group, another service provider, or the like. Accordingly, reducing the noise bound may increase the value to the third party 120 or to another entity.

In some embodiments, the third party 120 may include a DR aggregator. Generally, the DR aggregator may act as an intermediary between the utility 108 and the site 128 to coordinate and implement DR events. In some embodiments, an incentive offered by the utility 108 may be received by the DR aggregator. The DR aggregator may in turn offer some portion of the incentive to the customer 102 in exchange for participation by the site 128 in the DR event. The DR aggregator and/or the third party privacy module 116 may communicate a curtailment request of a DR event to the customer 102 and/or to the customer device 104. Additionally or alternatively, the utility server 110 may communicate the curtailment request to the customer device 104 and/or to the third party server 114.

For example, the DR aggregators or the third party 120 may be included in DR programs such as a capacity bidding program (CBP) and/or a demand bidding program (DBP). In CBP and DBP, a DR aggregator may submit a curtailment commitment to the utility 108 and curtailment requests to DR participants (e.g., the customer 102). Based on the actual curtailment accomplished and the committed amount, the DR aggregator may receive an incentive from the utility 108 and may distribute the incentive or some portion thereof to the customer 102.

Following the DR event, the third party privacy module 116 may request energy usage data of the customer 102 and/or the site 128 during the DR event. In response, the third party privacy module 116 may receive the noisy data, the encrypted message-signature pair, and a cryptographic proof or another proof from the customer 102 via the customer device 104. The third party privacy module 116 may then determine whether the cryptographic proof is a valid proof of an expression stating that the noisy data and the encrypted message-signature pair are members of a cryptographic proof language corresponding to the cryptographic proof.

When the cryptographic proof is not a valid proof of the expression, the third party privacy module 116 may suspend a DR transaction. For example, the DR aggregator may indicate to the customer 102 that the noisy data is unacceptable and may not provide the incentive to the customer 102. When the cryptographic proof is a valid proof of the expression, the third party privacy module 116 may accept the noisy data as the requested energy usage data. The third party privacy module 116 may then evaluate compliance of the customer 102 and/or the site 128 with the DR event based at least partially on the noisy data. If the DR aggregator determines that the noise bound is too high (e.g., the energy usage data is obfuscated such that the evaluation of the curtailment may not be made) or determines there may be value in reducing the noise bound, then the third party privacy module 116 may communicate to the customer 102 an offer to decrease a selected noise bound in exchange for a particular incentive.

Modifications, additions, or omissions may be made to the DR system 100 without departing from the scope of the present disclosure. Specifically, embodiments depicted in FIG. 1 include one customer 102, one customer device 104, one repository 124, one site 128, one utility 108, one utility server 110, one third party 120, and one third party server 114. However, the present disclosure applies to DR systems that may include one or more of the customers 102, one or more of the customer devices 104, one or more of the repositories 124, one or more of the sites 128, one or more of the utilities 108, one or more of the utility servers 110, one or more of the third parties 120, one or more of the third party servers 114, or any combination thereof. The present disclosure may also apply to DR systems in which electricity or any other resource may be curtailed.

Moreover, the separation of various components in the embodiments described herein is not meant to indicate that the separation occurs in all embodiments. It may be understood with the benefit of this disclosure that the described components may be integrated together in a single component or separated into multiple components.

The utility server 110, the third party privacy module 116, and the customer privacy module 106, or some combination thereof may include code and routines for privacy-preserving communication. In some embodiments, the utility server 110, the third party privacy module 116, the customer privacy module 106, or some combination thereof may act in part as a thin-client application that may be stored on a computing device and in part as components that may be stored on the customer device 104 and/or the third party server 114, for instance. In some embodiments, the utility server 110, the third party privacy module 116, the customer privacy module 106, or some combination thereof may be implemented using hardware including a field-programmable gate array (FPGA) or an application-specific integrated circuit (ASIC). In some other instances, the utility server 110, the third party privacy module 116, the customer privacy module 106, or some combination thereof may be implemented using a combination of hardware and software.

In the DR system 100, memory such as memory in the customer device 104, the utility server 110, the repository 124, and the third party server 114 may include a non-transitory memory that stores data for providing the functionality described herein. The memory may be included in storage that may be a dynamic random access memory (DRAM) device, a static random access memory (SRAM) device, flash memory, or some other memory devices. In some embodiments, the storage also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 2:
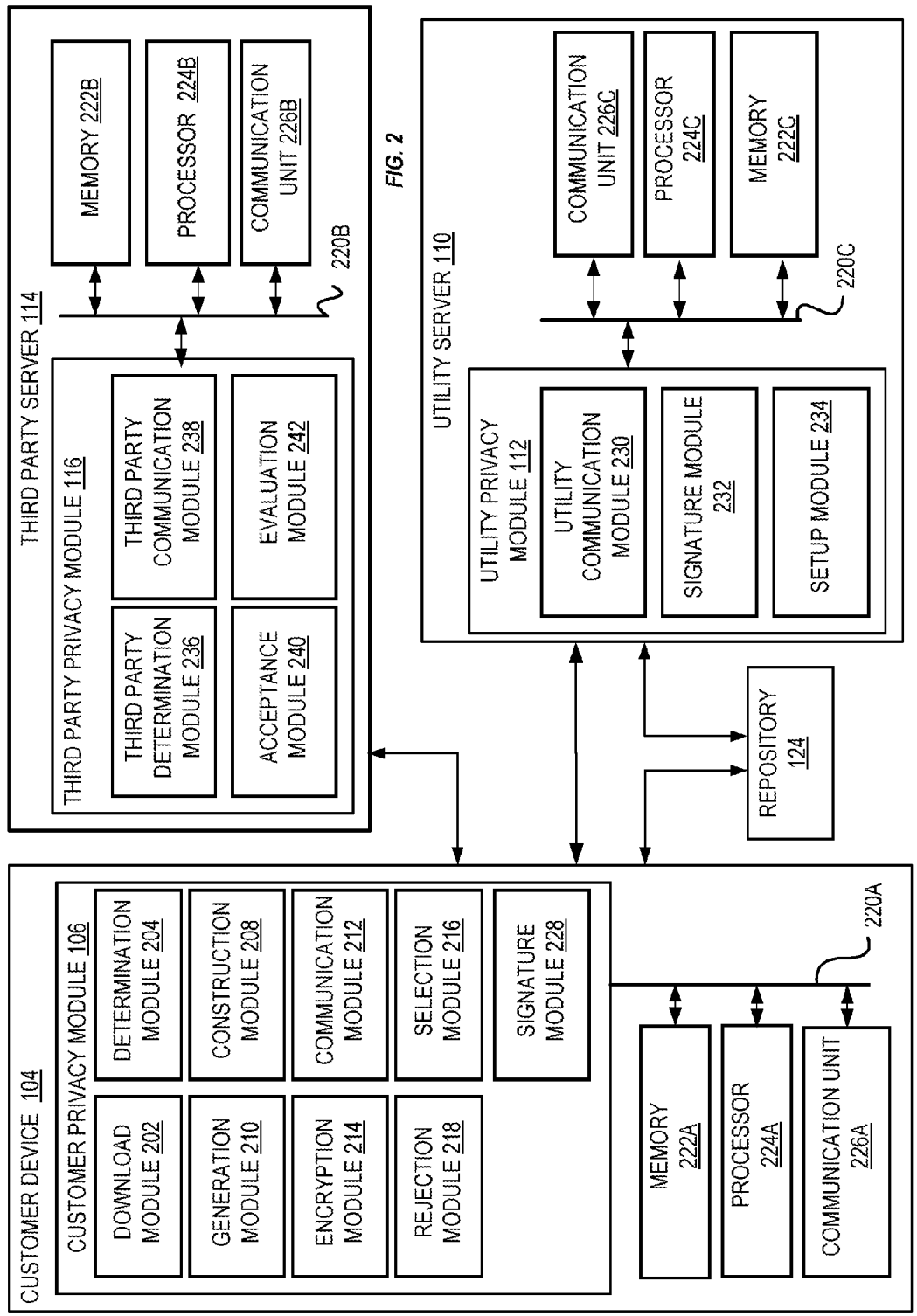
FIG. 2 illustrates an example customer device, an example third party server, and an example utility server which may be implemented in the DR system of FIG. 1.

FIG. 2 is a block diagram of an example of the customer device 104, an example of the third party server 114, and an example of the utility server 110. The customer device 104, the third party server 114, and the utility server 110 of FIG. 2 are generally described with combined reference to FIGS. 1 and 2.

The customer device 104 may include the customer privacy module 106, a processor 224A, a memory 222A, and a communication unit 226A. The customer privacy module 106, the processor 224A, the memory 222A, and the communication unit 226A may be coupled via a bus 220A. The third party server 114 may include the third party privacy module 116, a processor 224B, a memory 222B, and a communication unit 226B. The third party privacy module 116, the processor 224B, the memory 222B, and the communication unit 226B may be coupled via a bus 220B. The utility server 110 may include the utility privacy module 112, a processor 224C, a memory 222C, and a communication unit 226C. The utility privacy module 112, the processor 224C, the memory 222C, and the communication unit 226C may be coupled via a bus 220C. The processors 224A-224C may be referred to generally herein as the processor 224 or the processors 224, the memories 222A-222C may be referred to generally herein as the memory 222, the communication units 226A-226C may be referred to generally herein as the communication unit 226 or the communication units 226, and the buses 220A-220C may be referred to generally herein as the bus 220 or the buses 220.

The processors 224 may include an arithmetic logic unit (ALU), a microprocessor, a general-purpose controller, or some other processor array to perform computations and privacy preservation. Each of the processors 224 may be coupled to a corresponding one of the buses 220 for communication with the other components (e.g., 106, 112, 116, 222, and 226). The processors 224 generally process data signals and may include various computing architectures including a complex instruction set computer (CISC) architecture, a reduced instruction set computer (RISC) architecture, or an architecture implementing a combination of instruction sets. In FIG. 2 the customer device 104, the third party server 114, and the utility server 110 include a single processor 224. Alternately or additionally, one or more of the customer device 104, the third party server 114, and the utility server 110 may include multiple processors. Other processors, operating systems, and physical configurations may also be possible.

The memory 222 may be configured to store instructions and/or data that may be executed by one or more of the processors 224 to perform operations described herein. Each of the memories 222 may be coupled to a corresponding one of the buses 220 for communication with the other components. The instructions and/or data may include code for performing the techniques or methods described herein. The memory 222 may include a DRAM device, an SRAM device, flash memory, or some other memory device. In some embodiments, the memory 222 alternately or additionally includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 226 may be configured to transmit and receive data to and from one or more of the customer device 104, the repository 124, the third party server 114, and the utility server 110. Each of the communication units 226 may be coupled to a corresponding one of the buses 220. In some embodiments, the communication unit 226 includes a port for direct physical connection to the network 122 or to another communication channel. For example, the communication unit 226 may include a USB, SD, CAT-5, or similar port for wired communication with the components of the DR system 100. In some embodiments, the communication unit 226 may include a wireless transceiver for exchanging data via communication channels using one or more wireless communication methods, including IEEE 802.11, IEEE 802.16, BLUETOOTH®, or another suitable wireless communication method.

In some embodiments, the communication unit 226 includes a cellular communications transceiver for sending and receiving data over a cellular communications network including via SMS, MMS, HTTP, direct data connection, WAP, e-mail, or another suitable type of electronic communication. In some embodiments, the communication unit 226 includes a wired port and a wireless transceiver. The communication unit 226 may also provide other connections to the network 122 for distribution of files and/or media objects using standard network protocols including transmission control protocol/internet protocol (TCP/IP), HTTP, HTTP secure (HTTPS), and simple mail transfer protocol (SMTP), etc.

In the embodiment of FIG. 2, the customer privacy module 106 may include a download module 202, a determination module 204, a construction module 208, a generation module 210, a communication module 212, an encryption module 214, a selection module 216, a rejection module 218, and a signature module 228. The third party privacy module 116 may include a third party determination module 236, a third party communication module 238, an acceptance module 240, and an evaluation module 242. The utility privacy module 112 may include a utility communication module 230, a signature module 232, and a setup module 234.

One or more of the download module 202, the determination module 204, the construction module 208, the generation module 210, the communication module 212, the encryption module 214, the selection module 216, the rejection module 218, the signature module 228, the third party determination module 236, the third party communication module 238, the acceptance module 240, the evaluation module 242, the utility communication module 230, the signature module 232, the setup module 234 (collectively, privacy modules) may be implemented as software including one or more routines configured to perform one or more operations described herein. The privacy modules may include a set of instructions executable by the processors 224 to provide the functionality described below. In some instances, the privacy modules may be stored in or at least temporarily loaded into the memory 222 and may be accessible and executable by one or more of the processors 224. One or more of the privacy modules may be adapted for cooperation and communication with one or more of the processors 224 via one or more of the buses 220.

As discussed with reference to FIG. 1, the utility server 110 may be configured to collect energy usage data of the site 128. The collection of the energy usage data may be for billing purposes, for instance. In the DR system 100 of FIG. 1, there may be circumstances in which the customer 102 wants access to the energy usage data for communication to the third party 120. Accordingly, the utility server 110 may include the utility privacy module 112, the utility communication module 230, the signature module 232, and the setup module 234 to at least partially enable the customer 102 to receive the energy usage data and the signature.

For example, the setup module 234 may be configured to perform or communicate algorithms included in a signature scheme and/or a public key encryption (PKE) scheme. The signature scheme may define a signature key generation algorithm which outputs a pair of keys for the utility 108. A first of the pair may include a signing key, which may be retained at the utility 108. A second of the pair may include a verification key, which may be published to the public.

The signature scheme may also define a sign algorithm. The sign algorithm may input the signing key and a message (e.g., energy usage data) and may output the signature. The signature scheme may also define a verify algorithm. The verify algorithm may input the verification key, the signature, and the message and may output a success or a failure. The success may indicate that the utility 108 signed the message and a failure may indicate that the utility 108 has not signed the message.

The PKE scheme may define a PKE key generation algorithm, which may output a pair of keys for the customer 102 that includes a decryption key (sometimes referred to as a private key) and a public key. The public key may be published to the public. The PKE scheme may define an encryption algorithm. The encryption algorithm may input the public key, a message (e.g., the energy usage data), and a generated random number and may output a ciphertext. The PKE scheme may define a decrypt algorithm. The decrypt algorithm may input the decryption key and the ciphertext and may output a plaintext.

An example of the signature scheme may include an existentially unforgeable signature scheme. An example of the PKE scheme may include a secure encryption scheme. For example, the PKE scheme may include a secure encryption scheme that satisfies one or more provable security properties such as indistinguishability under chosen plaintext attack (IND-CPA), indistinguishability under chosen ciphertext attach (IND-CCA) (e.g., IND-CCA1 and/or IND-CCA2), or another suitable secure encryption scheme.

In the depicted embodiment, the setup module 234 is included in the utility server 110. Additionally or alternatively, the setup module 234 may be included in the third party server 114, the customer device 104, the repository 124, or another server or computing device. Moreover, in some embodiments, a portion of the operations attributed to the setup module 234 may be performed by one or more of the third party server 114, the customer device 104, and another server or computing device. In these and other embodiments, the sign algorithm, the signing key, or one or more other parameters or algorithms may be communicated to the utility server 110.

The signature module 232 may be configured to receive the energy usage data collected by the utility 108 and to sign the energy usage data. For example, the sign algorithm may be used to sign the energy usage data. In some embodiments, the sign algorithm may be quantified by an example sign algorithm:

$$\sigma := \text{Sign}(sk_U, m)$$

In the foregoing sign algorithm, σ represents the signature output by the sign algorithm. Sign represents the sign algorithm. The parameter $sk_U$ represents the signing key. The variable m represents the energy usage data (or another message).

The utility communication module 230 may be configured to handle communications between the utility privacy module 112 and other components of the utility server 110 (e.g., 222, 224, and 226). The utility communication module 230 may be configured to send and receive data, via the communication unit 226 to the repository 124, the customer device 104, and the third party server 114, or some combination thereof. In some instances, the utility communication module 230 may cooperate with the other modules (e.g., 232, 230, and 234) to receive and/or forward, via the communication unit 226, data from one or more of the repository 124, the customer device 104, and the third party server 114.

For example, the utility communication module 230 may be configured to communicate the verification algorithm to the third party server 114 and/or to the customer device 104. The third party server 114 may then use the published verification key to determine whether to verify the signature and/or noisy data communicated to the third party server 114. The utility communication module 230 may communicate the PKE key generation algorithm and/or the signature key generation algorithm to the customer device 104 such that the one or more keys may be locally generated therefrom.

The utility communication module 230 may also be configured to communicate energy usage data to the repository 124. In some embodiments, the utility communication module 230 may communicate the energy usage data and the signature output from the sign algorithm. The utility privacy module 112 may communicate the signature and/or the energy usage data to the repository 124 periodically, continuously, or in response to a request from the customer device 104 and/or the third party 120.

Referring to FIG. 2, the third party privacy module 116 and the customer privacy module 106 are described in the context of a DR transaction. The DR transaction may include the communication of energy usage data following a DR event. This description is an example of a reason to communicate the energy usage data in the DR system 100. In other embodiments, the third party may include another type of service provider, which may provide another service based on the energy usage data. In these other embodiments, privacy of the customer 102 may be preserved similarly to the embodiments in which the third party 120 includes the DR aggregator.

In the context of the DR transaction, the third party communication module 238 may be configured to communicate a curtailment request of the DR event. The third party communication module 238 may be configured to communicate the curtailment request to the communication module 212 of the customer privacy module 106, for example, via the network 122 and the communication units 226A and 226B. The curtailment request may include or identify a quantity of energy to curtail during the DR event, a duration of the DR event, and other DR event criteria.

During the DR event, the customer 102 may curtail energy use at the site 128. The utility 108 may collect energy usage data during the DR event. Following the DR event, the third party communication module 238 may request energy usage data of the customer 102 during the DR event. A request may be communicated to the communication module 212 of the customer privacy module 106.

In response to the request, the download module 202 of the customer privacy module 106 may then download energy usage data signed with the signature of the utility 108 (e.g., according to the sign algorithm). Specifically, the download module 202 may download the energy usage data from the repository collected by the utility 108 during the DR event. The download module 202 may communicate the energy usage data signed by the utility 108 to the determination module 204.

The determination module 204 may be configured to receive the energy usage data and to determine whether the signature of the energy usage data is that of the utility 108. In some embodiments, the verification algorithm may be used to determine whether the signature of the energy usage data is that of the utility 108. For example, the determination module 204 may make such determination according to a verification expression:

$$Ver(vk_U, \sigma, m)$$

In the verification expression, Ver represents the verification algorithm. The parameter $vk_U$ represents the verification key which may be published. The parameter m represents the energy usage data. If the verification expression is false, the determination module 204 may communicate a signal to the rejection module 218. In response, the rejection module 218 may reject the energy usage data. If the verification expression is true, the determination module 204 may communicate a signal indicating the verification expression is true to the encryption module 214 and the generation module 210.

The encryption module 214 may be configured to receive the signal from the determination module 204. The encryption module 214 may be configured to encrypt a message-signature pair including the energy usage data and a verified signature. For example, in some embodiments, an encrypted message-signature pair may be defined according to an example encryption expression:

$$e := Enc(pk, (m, \sigma), r)$$

In the encryption expression, e represents the encrypted signature-message pair. The operator := represents a definitional operator. The variable m represents the energy usage data. The parameter $\sigma$ represents the signature of the utility 108 output from the sign algorithm. The parameter pk represents the public key from the PKE scheme. The operator Enc( ) represents the encryption algorithm. The variable r represents a generated random number. The encryption module 214 may communicate the encrypted message-signature pair to the communication module 212 of the customer privacy module 106.

The generation module 210 may be configured to generate noisy data based on adding random noise to the energy usage data. In some embodiments, the random noise may be added according to a noise bound. In these and other embodiments, a selection module 216 may be configured to receive a selection of a noise bound.

In some embodiments, the noise bound may be defined according to a noise bound equation:

$$\left| \frac{(m' - m)}{m} \right| \leq \varepsilon$$

In the noise bound equation, the variable m represents the energy usage data. The variable m' represents the noisy data. The variable $\varepsilon$ represents the selected noise bound. For example, if the noise bound is selected as 10%, $\varepsilon$ equals 0.10. The operator || represents absolute value. Accordingly, the noisy data represents the energy usage data modified with random noise having a limited deviation from the energy usage data.

For example, the selection module 216 may be coupled to a user input or to a privacy setting tool in which a customer selects a privacy preference. The privacy preference may correspond to a noise bound. The selection module may communicate the selected noise bound to the generation module 210 and the noise bound may be used as a basis for generating the noisy data. The generation module 210 may communicate the noisy data to the communication module 212 of the customer privacy module 106.

The construction module 208 may be configured to construct a proof such as a cryptographic proof. In some embodiments, the cryptographic proof may include a non-interactive zero knowledge (NIZK) proof Generally, a zero knowledge proof (e.g., interactive rather than non-interactive) may include a protocol by which one party, which may be referred to as a prover, may prove to another party, which may be referred to as a verifier, that a statement is true, without conveying any additional information apart from a message that the statement is, in fact, true. Zero knowledge proofs may generally include the properties of completeness, soundness, and zero knowledge. Completeness may stem from inclusion of a protocol element pointing to a witness that may "testify" to the truth of the statement. Soundness may stem from a protocol element that prohibits a malicious prover from convincing the verifier if the statement is false. Zero knowledge may stem from a protocol element that enables the verifier to learn only that the statement is true. NIZK is a variant of zero knowledge proofs in which no interaction occurs between the prover and the verifier. For example, in some circumstances, a common reference string shared between the prover and the verifier may be enough to achieve computational NIZK.

An NIZK for a non-deterministic polynomial time (NP) language may define an NIZK key generation algorithm, a prover, and a verifier. The NIZK key generation algorithm may generate a common reference string (CRS) and may publish the CRS to the public. The NIZK prover may input the CRS, a candidate, and a witness to its membership in the NP language, and may output a "proof" The NIZK verifier may input the CRS, a proof, and a candidate and may output a "success" or "failure." With high probability, a success indicates that the candidate is a member of the NP language.

Implementation of an NIZK for an NP language may involve two steps. A first step may include transforming the NP language to a Boolean circuit-satisfiability problem. The transformation may be done in a standard way. The second step may include constructing an NIZK system for the Boolean circuit-satisfiability problem using existing results in cryptography. Some other techniques may also be used for special languages, such as those defined using linear operations over cyclic groups. Some of these techniques may use bilinear groups, such as certain elliptic curve groups, which support a pairing operation.

Some additional details of NIZK and implementation of NIZK may be found in M. Blum, P. Feldman, and S. Micali, Non-Interactive Zero-Knowledge and its Applications. In *Proceedings of the Twentieth Annual ACM Symposium on Theory of Computing*, pages 103-112, ACM, 1988; J. Groth, Short Pairing-Based Non-Interactive Zero-Knowledge Arguments. In *Advances in Cryptology-ASIACRYPT* 2010, pages 321-340, Springer, 2010; J. Groth, R. Ostrovsky, and A. Sahai, Perfect Non-Interactive Zero Knowledge for np. In *Advances in Cryptology-EUROCRYPT* 2006, pages 339-358, Springer, 2006; J. Groth and A. Sahai, Efficient Non-Interactive Proof Systems for Bilinear Groups. In *Advances in Cryptology-EUROCRYPT* 2008, pages 415-432, Springer, 2008; C. S. Jutla and A. Roy, Shorter Quasi-Adaptive NIZK Proofs for Linear Subspaces. In *ASIACRYPT,* 2013; and M. Sipser, *Introduction to the Theory of Computation.* International Thomson Publishing, 1st edition, 1996. The foregoing references are herein incorporated by reference in their entireties.

In embodiments in which the cryptographic proof includes an NIZK proof, the setup module 234 may generate an NIZK proof system. The NIZK system may include an NIZK proof, which may be configured to establish that the encrypted message-signature pair and the noisy data are members of a designed NP language.

An example of the designed NP language may be defined according to an example designed NP language expression:

$$L_{\varepsilon,pk,vk_U} = \left\{ \begin{array}{c} (m', e) \mid \exists\, m, \sigma, r : \left|\frac{(m'-m)}{m}\right| \le \varepsilon \\ \wedge\ Ver(vk_U, \sigma, m) = 1 \\ \wedge\ e = Enc(pk, (m, \sigma), r) \end{array} \right\}$$

In the designed NP language expression, e, Ver( ) Enc( ), pk, m, $\sigma$, r, m', $\varepsilon$, $vk_U$ and $\|$ are as described above. The parameter $L_{\varepsilon,pk,vkU}$ represents the designed NP language. The operator $\wedge$ represents a logical conjunction operator. The operator | represents a conditional event operator. The operator : represents a "such that" operator. The operator $\exists$ represents an existential quantification operator.

In the designed NP language expression, a message (e.g., the noisy data) and an encrypted message-signature pair belong to the language if the prover has a message (e.g., the energy usage data) and a signature (e.g., the signature of the utility 108), such that the message is within a noise bound of the message and the utility 108 signed the message and the encrypted message-signature pair is an encryption of such a message-signature pair.

The construction module 208 may accordingly be configured to construct an NIZK proof configured to establish that the encrypted message-signature pair and the noisy data are members of a designed NP language. In some embodiments, the NIZK proof may be constructed according to an NIZK expression:

$$\pi := P(\psi, (m', e), (m, \sigma, r))$$

In the NIZK expression, e, :=, r, m, $\sigma$, m' are as described above. The parameter r represents the NIZK proof. The parameter $\Psi$ represents an NIZK CRS. P represents the prover. In the NIZK expression, the prover receives the CRS, a candidate that may include the noisy data and the encrypted message-signature pair, and a witness that may include the energy usage data, the signature, and the random number and generates an NIZK proof.

The construction module 208 may be configured to communicate the NIZK proof and/or another constructed cryptographic proof to the communication module 212 of the customer privacy module 106. The communication module 212 may communicate the noisy data, the encrypted message-signature pair, and the cryptographic proof to the third party communication module 238.

The third party communication module 238 may receive the noisy data, the encrypted message-signature pair, and the cryptographic proof. The third party communication module 238 may communicate the noisy data, the encrypted message-signature pair, and the cryptographic proof to the third party determination module 236.

The third party determination module 236 may be configured to determine whether the cryptographic proof is valid. For example, in embodiments in which the construction module 208 constructs an NIZK proof, the third party determination module 236 may be configured to determine if an NIZK proof is a valid proof of the designed NP language. The determination may be made according to the NIZK proof expression:

$$V(\psi, \pi, (m', e))$$

In the NIZK proof expression, $\Psi$, $\pi$, m', e are as above. The operator V represents the verifier of the NIZK system. If the NIZK proof expression fails, then the third party determination module 236 may communicate a signal to the acceptance module 240 indicating that the NIZK proof expression fails. In response, the acceptance module 240 may suspend a DR transaction with the customer 102.

If the NIZK proof expression succeeds, then the third party determination module 236 may communicate a signal to the acceptance module 240 indicating that the NIZK proof expression succeeds. The acceptance module 240 may accept the noisy data as the requested energy usage data. The acceptance module 240 may then communicate the noisy data to the evaluation module 242. The evaluation module 242 may evaluate compliance of the customer 102 with the DR event based at least partially on the noisy data. The evaluation module 242 may also determine whether the noise bound is too high. In response, the acceptance module 240 may suspend the DR transaction.

Figure 3:
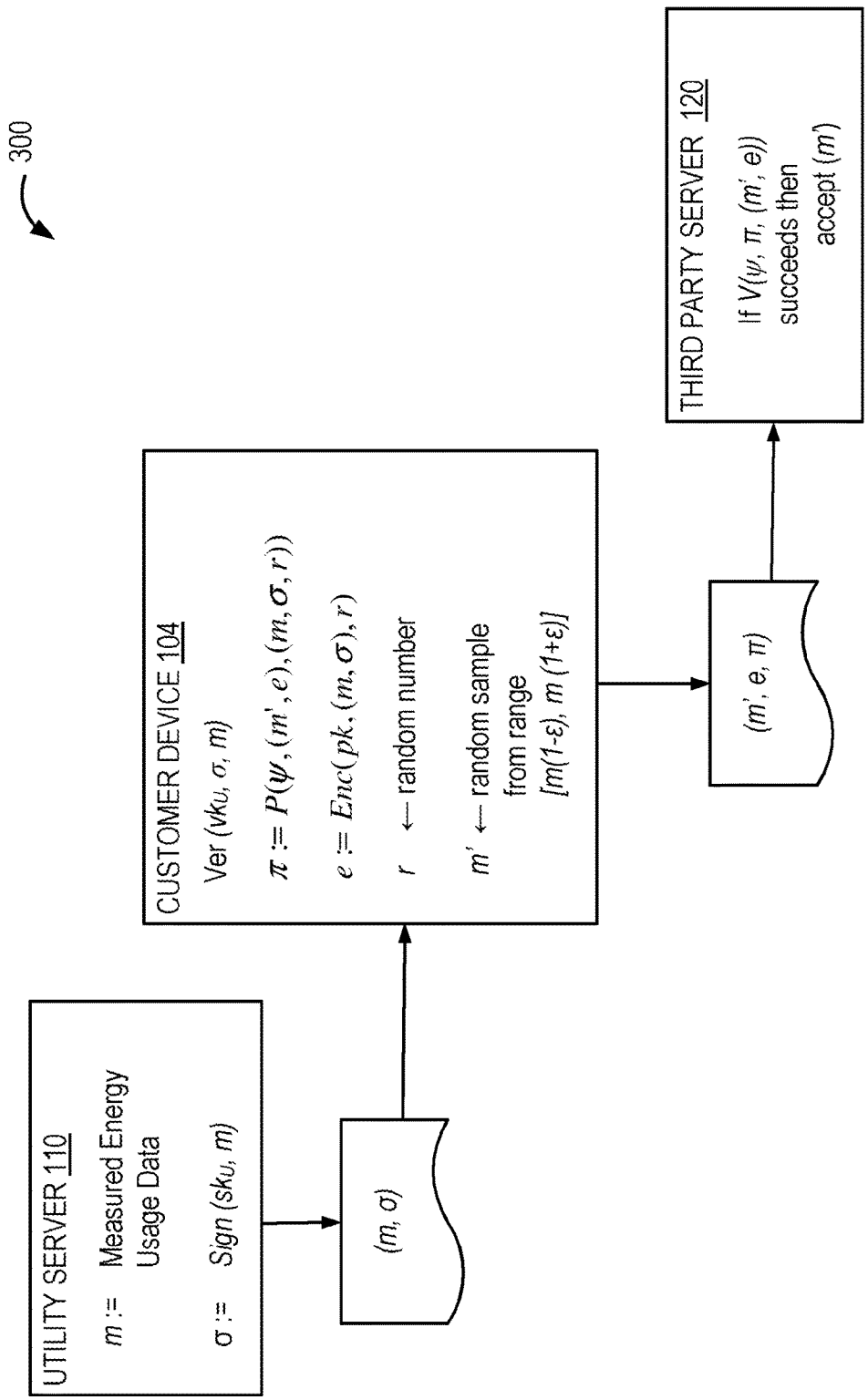
FIG. 3 is a flow diagram depicting an example protocol which may be implemented in the DR system of FIG. 1.

FIG. 3 illustrates a flow diagram of an example protocol flow 300 that may be implemented in the DR system 100 of FIG. 1. The flow diagram includes the utility server 110, the customer device 104, and the third party server 114. One or more operations performed in each of the utility server 110, the customer device 104, and the third party server 114 are included therein. As used in FIG. 3, the symbols, parameters, and operators are as described above.

Specifically, in the utility server 110 the energy usage data may be collected and the energy usage data may be signed. The utility server 110 may communicate the energy usage data and the signature to the customer device 104. At the customer device 104, the signature of the energy usage data may be verified. Additionally, at the customer device 104, the NIZK proof may be constructed, the message-signature pair may be encrypted, the random number may be generated, and the noisy data may be generated. The noisy data, the encrypted message-signature pair, and the NIZK proof may be communicated to the third party server 114. At the third party server 114, the NIZK proof may be checked as a valid proof of the noise data and the encrypted message-signature pair as a member of the NIZK system. The noisy data may be accepted at the third party server 114.

Figure 4:
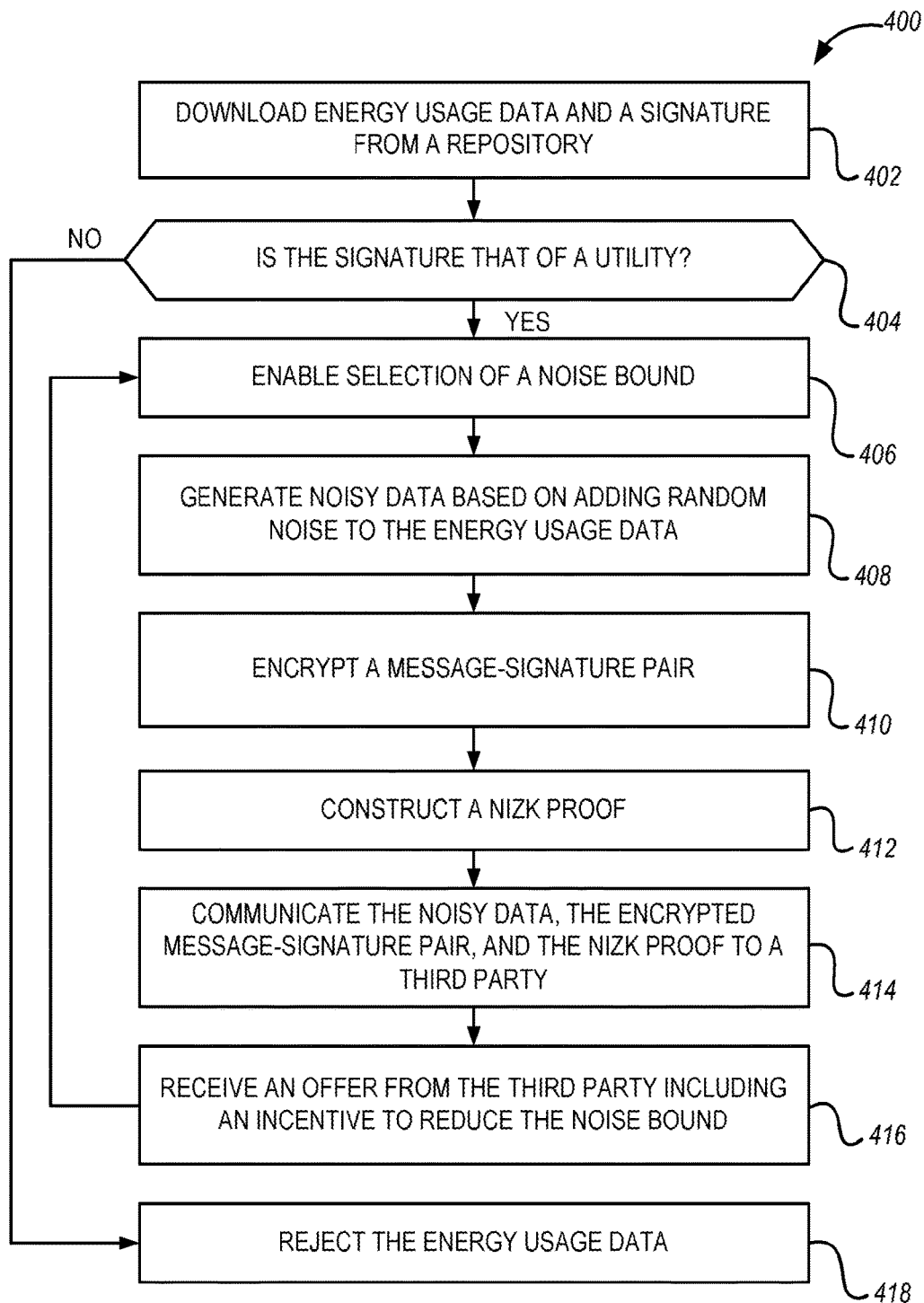
FIG. 4 is a flow diagram of an example method of energy usage data privacy preservation.

FIG. 4 is a flow diagram of an example method 400 of energy usage data privacy preservation, arranged in accordance with at least one embodiment described herein. The method 400 may be performed in a DR system such as the DR system 100 of FIG. 1. The method 400 may be programmably performed in some embodiments by the customer device 104 described with reference to FIGS. 1 and 2. The customer device 104 may include or may be communicatively coupled to a non-transitory computer-readable medium (e.g., the memory 222A of FIG. 2) having stored thereon or encoded therein programming code or instructions that are executable by a processor to perform or cause performance of the method 400. Additionally or alternatively, the customer device 104 may include a processor (e.g., the processor 224A of FIG. 2) that is configured to execute computer instructions to cause or control performance of the method 400. Although illustrated as discrete blocks, various blocks may be divided into additional blocks, combined into fewer blocks, or eliminated, depending on the desired implementation.

The method 400 may begin at block 402. At block 402, energy usage data and a signature may be downloaded from a repository. At block 404, it may be determined whether the signature is that of a utility. When the signature is not that of the utility ("No" at block 404), the method 400 may proceed to block 418. At block 418, the energy usage data may be rejected. When the signature is that of the utility ("Yes" at block 404), the method 400 may proceed to block 406.

At block 406, input effective to select a noise bound may be received. In some embodiments, the noise bound may be quantified as a portion of the energy usage data. For example, the selected noise bound may be 8%. At block 408, noisy data may be generated by adding random noise to the energy usage data. In some embodiments, the random noise added to the energy usage data may vary the energy usage data by an amount up to or less than the selected noise bound. For example, if the selected noise bound is 10%, then the noisy data may include data that is in a range of 90% to 110% of the energy usage data.

At block 410, a message-signature pair may be encrypted. The message-signature pair may include the energy usage data and the verified signature. At 412, a proof may be constructed. The proof may be configured to establish that the encrypted message-signature pair and the noisy data are members of a corresponding proof language. An example of the proof and the proof language may include the NIZK proof and the designed NP language described with reference to FIG. 2. At block 414, the noisy data, the encrypted message-signature pair, and the proof may be communicated to a third party.

At block 416, an offer may be received from the third party. The offer may include an incentive to reduce the noise bound. After the offer is received, the method 400 may proceed to block 406 and continue to one or more of blocks 408, 410, 412, and 414.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For example, in some embodiments or circumstances, block 416 may be omitted.

Figure 5:
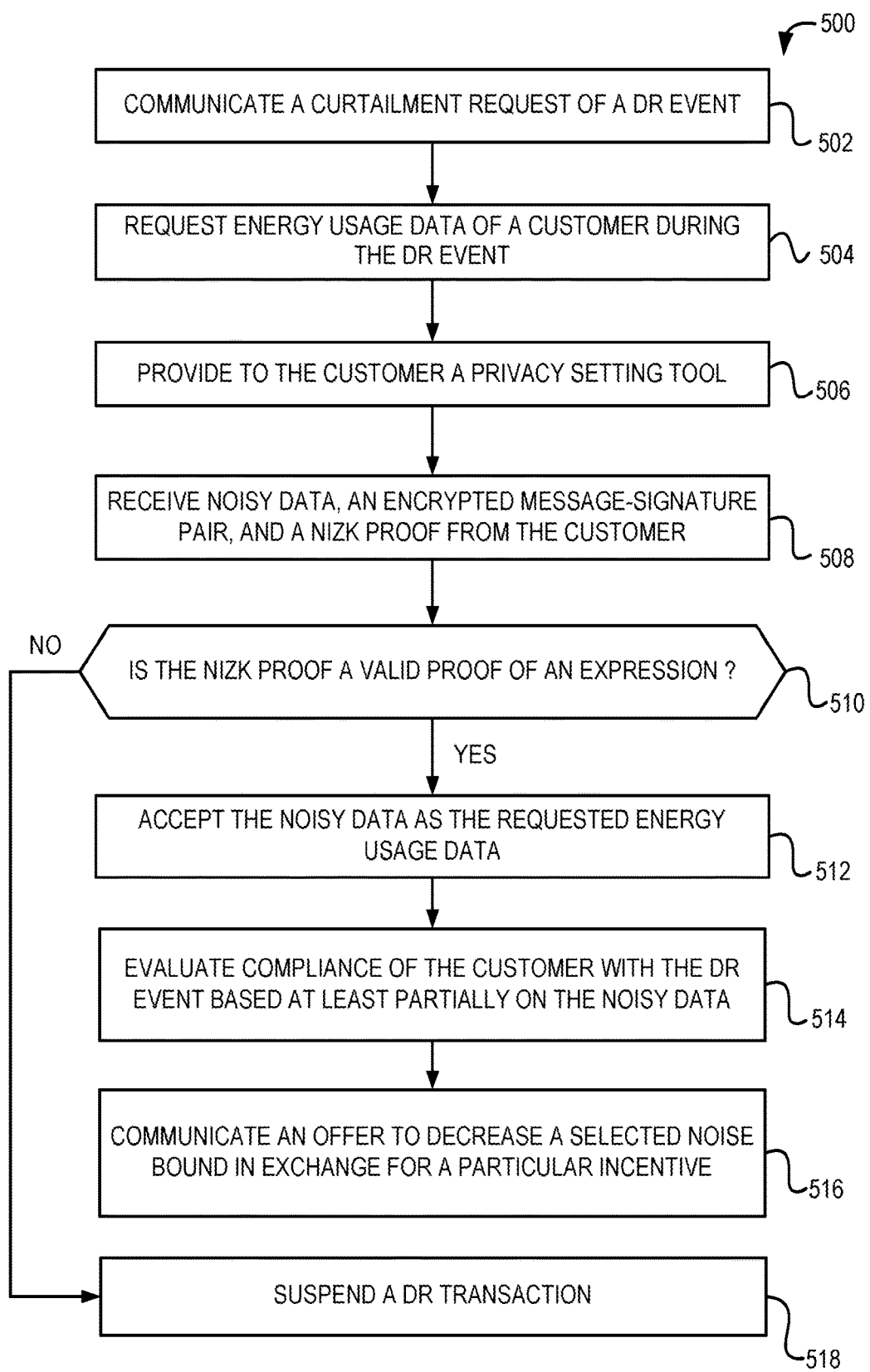
FIG. 5 is a flow diagram of an example method of DR event implementation, in accordance with at least one embodiment described herein.

FIG. 5 is a flow diagram of an example method 500 of DR implementation, arranged in accordance with at least one embodiment described herein. The method 500 may be performed in a DR system such as the DR system 100 of FIG. 1. The method 500 may be programmably performed in some embodiments by the third party server 114 described with reference to FIGS. 1 and 2. The third party server 114 may include or may be communicatively coupled to a non-transitory computer-readable medium (e.g., the memory 222B of FIG. 2) having stored thereon or encoded therein programming code or instructions that are executable by a processor to perform or cause performance of the method 500. Additionally or alternatively, the third party server 114 may include a processor (e.g., the processor 224B of FIG. 2) that is configured to execute computer instructions to cause or control performance of the method 500. Although illustrated as discrete blocks, various blocks may be divided into additional blocks, combined into fewer blocks, or eliminated, depending on the desired implementation.

The method 500 may begin at block 502. At block 502, a curtailment request of a DR event may be communicated to a customer and/or a customer device. In some embodiments, the curtailment request may be communicated from a DR aggregator and/or a third party server to solicit participation in the DR event. At block 504, energy usage data of a customer during the DR event may be requested. The request for the energy usage data may be made to the customer after completion of the DR event. At block 506, a privacy setting tool may be provided to the customer. The privacy setting tool may receive a selection by the customer of a privacy setting that may identify or correspond to a particular noise bound. The particular noise bound may thereby be selected and used to generate noisy data as described herein.

At block 508, noisy data, an encrypted message-signature pair, and a proof may be received from the customer. The proof may include, for example, a NIZK proof. At block 510, it may be determined whether the proof is a valid proof of an expression. The expression may state that the noisy data and the encrypted message-signature pair are members of a proof language corresponding to the proof. For example, the proof language may include a designed NP language. When the proof is not a valid proof of the expression ("No" at block 510), the method 500 may proceed to block 518. At block 518, a DR transaction may be suspended.

When the proof is a valid proof of the expression ("Yes" at block 510), the method 500 may proceed to block 512. At block 512, the noisy data may be accepted as the requested energy usage data. At block 514, compliance with the DR event of the customer may be evaluated based at least partially on the noisy data.

At block 516, an offer may be communicated to the customer to decrease a selected noise bound in exchange for a particular incentive. For example, the noisy data may be more valuable if the selected noise bound is reduced. Accordingly, the offer may be communicated to attempt to receive the more valuable noisy data.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For example, in some embodiments the third party (e.g., the third party 120) may include another type of service provider as described elsewhere herein. In these embodiments, blocks 502, 516, 518, or some combination thereof may be omitted. Additionally, in these and other embodiments, block 504 may include a request for energy usage data unrelated to a DR event and block 514 may include an evaluation unrelated to a DR event.

The embodiments described herein may include the use of a special-purpose or general-purpose computer including various computer hardware or software modules, as discussed in greater detail below.

As indicated above, some embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other non-transitory storage medium which may be used to carry or store desired program code means in the form of computer-executable instructions or data structures and which may be accessed by a general-purpose or special-purpose computer. Combinations of the above should also be included within the scope of computer-readable media.

Computer-executable instructions may include, for example, instructions and data which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of energy usage data privacy preservation, the method comprising:
   downloading energy usage data and a signature from a repository;
   receiving input effective to select a noise bound;
   determining whether the signature is that of a utility;
   rejecting the energy usage data when the signature is not that of the utility; and
   when the signature is that of the utility:
      generating noisy data by adding random noise to the energy usage data, the random noise being configured to vary the energy usage data by an amount less than the noise bound;
      encrypting a message-signature pair that includes the energy usage data and a verified signature;
      constructing a proof configured to establish that the encrypted message-signature pair and the noisy data are members of a corresponding proof language; and
      communicating the noisy data, the encrypted message-signature pair, and the proof to a third party.

2. The method of claim 1, wherein:
the noise bound is quantified as a portion of the energy usage data; and
the random noise has no or an unrelated meaning to the energy usage data itself and is randomly sampled with respect to the energy usage data.

3. The method of claim 1, wherein:
the noise bound is defined according to a noise bound equation:

$$\left|\frac{(m'-m)}{m}\right| \le \varepsilon;$$

and wherein:
m represents the energy usage data;
m' represents the noisy data;
| ... | represents an absolute value operator; and
$\varepsilon$ represents the noise bound.

4. The method of claim 1, further comprising:
receiving an offer from the third party that includes an incentive to reduce the noise bound; and
re-generating the noisy data based on a second noise bound in exchange for the incentive.

5. The method of claim 1, wherein:
the proof includes a non-interactive zero knowledge (NIZK) proof; and
the corresponding proof language includes a specifically-configured language that belongs to a class of non-deterministic polynomial time (NP) languages (designed NP language).

6. The method of claim 5, wherein:
the designed NP language is defined according to a designed NP language expression:

$$L_{\varepsilon, pk, vk_U} = \left\{ \begin{array}{l} (m', e) \mid \exists m, \sigma, r : \left|\frac{(m'-m)}{m}\right| \le \varepsilon \\ \wedge\, Ver(vk_U, \sigma, m) = 1 \\ \wedge\, e = Enc(pk, (m, \sigma), r) \end{array} \right\};$$

the NIZK proof is defined according to an NIZK proof expression $\pi := P(\psi, (m', e), (m, \sigma, r))$; and
the encrypted message-signature pair is defined according to an encrypted message-signature pair expression $e := Enc(pk, (m, \sigma), r)$, and wherein:
$L_{\varepsilon, pk, vk_U}$ represents the designed NP language;
m represents the energy usage data;
m' represents the noisy data;
$\varepsilon$ represents the noise bound;
$\sigma$ represents the signature, which is output from a sign algorithm;
$vk_U$ represents a verification key;
Ver( ) represents a verification algorithm;
pk represents a public key;
Enc( ) represents an encryption algorithm;
^ represents a logical conjunction operator;
| represents a conditional event operator;
| ... | represents an absolute value operator;
: represents a "such that" operator;

∃ represents an existential quantification operator;
π represents the NIZK proof;
:= represents a definitional operator;
P represents an NIZK prover;
Ψ represents an NIZK common reference string (CRS);
e represents the encrypted message-signature pair; and
r represents a random number.

7. The method of claim 1, wherein:
the signature is generated using an existentially unforgeable signature scheme; and
the encrypting is performed using a secure encryption scheme that satisfies one or more provable security properties.

8. A non-transitory computer-readable medium having encoded therein programming code executable by a processor to perform operations comprising:
downloading energy usage data and a signature from a repository;
receiving input effective to select a noise bound;
determining whether the signature is that of a utility;
rejecting the energy usage data when the signature is not that of the utility; and
when the signature is that of the utility:
generating noisy data by adding random noise to the energy usage data, the random noise being configured to vary the energy usage data by an amount less than the noise bound;
encrypting a message-signature pair that includes the energy usage data and a verified signature;
constructing a proof configured to establish that the encrypted message-signature pair and the noisy data are members of a corresponding proof language; and
communicating the noisy data, the encrypted message-signature pair, and the proof to a third party.

9. The non-transitory computer-readable medium of claim 8, wherein:
the noise bound is quantified as a portion of the energy usage data; and
the random noise has no or an unrelated meaning to the energy usage data itself and is randomly sampled with respect to the energy usage data.

10. The non-transitory computer-readable medium of claim 8, wherein:
the noise bound is defined according to a noise bound equation:

$$\left| \frac{(m' - m)}{m} \right| \leq \varepsilon;$$

and wherein:
m represents the energy usage data;
m' represents the noisy data;
| . . . | represents an absolute value operator; and
ε represents the noise bound.

11. The non-transitory computer-readable medium of claim 8, wherein the operations further comprise:
receiving an offer from the third party that includes an incentive to reduce the noise bound; and
re-generating the noisy data based on a second noise bound in exchange for the incentive.

12. The non-transitory computer-readable medium of claim 8, wherein:
the proof includes a non-interactive zero knowledge (NIZK) proof; and
the corresponding proof language includes a specifically-configured language that belongs to a class of non-deterministic polynomial time (NP) languages (designed NP language).

13. The non-transitory computer-readable medium of claim 12, wherein:
the designed NP language is defined according to a designed NP language expression:

$$L_{\varepsilon, pk, vk_U} = \left\{ (m', e) \mid \exists m, \sigma, r : \begin{array}{l} \left| \frac{(m' - m)}{m} \right| \leq \varepsilon \\ \wedge \; Ver(vk_U, \sigma, m) = 1 \\ \wedge \; e = Enc(pk, (m, \sigma), r) \end{array} \right\};$$

the NIZK proof is defined according to an NIZK proof expression π:=P(ψ, (m', e), (m, σ, r)); and
the encrypted message-signature pair is defined according to an encrypted message-signature pair expression e:=Enc(pk, (m, σ), r), and wherein:
$L_{\varepsilon, pk, vk_U}$ represents the designed NP language;
m represents the energy usage data;
m' represents the noisy data;
ε represents the noise bound;
σ represents the signature, which is output from a sign algorithm;
$vk_U$ represents a verification key;
Ver ( ) represents a verification algorithm;
pk represents a public key;
Enc( ) represents an encryption algorithm;
^ represents a logical conjunction operator;
| represents a conditional event operator;
| . . . | represents an absolute value operator;
: represents a "such that" operator;
∃ represents an existential quantification operator;
π represents the NIZK proof;
:= represents a definitional operator;
P represents an NIZK prover;
Ψ represents an NIZK common reference string (CRS);
e represents the encrypted message-signature pair; and
r represents a random number.

14. The non-transitory computer-readable medium of claim 8, wherein:
the signature is generated using an existentially unforgeable signature scheme; and
the encrypting is performed using a secure encryption scheme that satisfies one or more provable security properties.

* * * * *